(12) United States Patent
Bhesania et al.

(10) Patent No.: US 7,984,228 B2
(45) Date of Patent: Jul. 19, 2011

(54) DEVICE CONNECTION ROUTING FOR CONTROLLER

(75) Inventors: Firdosh K. Bhesania, Kirkland, WA (US); Glen T. Slick, Redmond, WA (US); Randall E. Aull, Kenmore, WA (US); Mark E. Maszak, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 11/276,443

(22) Filed: Feb. 28, 2006

(65) Prior Publication Data
US 2007/0208848 A1 Sep. 6, 2007

(51) Int. Cl.
*G06F 13/00* (2006.01)
(52) U.S. Cl. ........ 710/316; 710/311; 710/313; 709/223; 709/224; 709/228; 709/238; 370/462; 370/468; 713/320; 713/323; 713/324
(58) Field of Classification Search .................. 710/316, 710/31
See application file for complete search history.

(56) References Cited

U.S. PATENT DOCUMENTS

| | | | |
|---|---|---|---|
| 6,460,143 B1 * | 10/2002 | Howard et al. ............... | 713/323 |
| 6,526,462 B1 * | 2/2003 | Elabd ............................ | 710/242 |
| 6,549,966 B1 * | 4/2003 | Dickens et al. ............... | 710/300 |
| 6,553,446 B1 * | 4/2003 | Miller ........................... | 710/307 |
| 6,574,663 B1 * | 6/2003 | Bakshi et al. ................. | 709/223 |
| 6,658,512 B1 * | 12/2003 | Gokulrangan ................. | 710/117 |
| 6,704,812 B2 * | 3/2004 | Bakke et al. ..................... | 710/38 |
| 6,721,317 B2 * | 4/2004 | Chong, Jr. ..................... | 370/389 |
| 6,839,793 B2 * | 1/2005 | Ragland ......................... | 710/316 |
| 7,173,964 B2 * | 2/2007 | Hsu ................................. | 375/225 |
| 7,464,174 B1 * | 12/2008 | Ngai .............................. | 709/234 |
| 2002/0004915 A1 * | 1/2002 | Fung .............................. | 713/320 |
| 2002/0156918 A1 * | 10/2002 | Valdevit et al. ............... | 709/238 |
| 2002/0184329 A1 * | 12/2002 | Chen et al. ..................... | 709/213 |
| 2003/0046270 A1 * | 3/2003 | Leung et al. ..................... | 707/1 |
| 2003/0191853 A1 * | 10/2003 | Ono ............................. | 709/232 |
| 2003/0227568 A1 * | 12/2003 | Stahl et al. ..................... | 348/552 |
| 2004/0054857 A1 * | 3/2004 | Nowshadi ..................... | 711/153 |
| 2005/0027910 A1 * | 2/2005 | Barrett et al. ................... | 710/62 |

(Continued)

FOREIGN PATENT DOCUMENTS

EP          426911 A1 *  5/1991

(Continued)

OTHER PUBLICATIONS

IBM Technical Disclosure NA9109377, 1991.*

(Continued)

*Primary Examiner* — Henry W Tsai
*Assistant Examiner* — Steven G Snyder

(57) ABSTRACT

Device connection routing for controllers is provided. A computing device is configured with multiple controllers that provide connections for peripheral devices. The controllers enable the peripheral devices to interact with the computing device through a bus. Each device connection is routed to one of the multiple controllers based on one or more pre-determined factors. These factors may include load-balancing, power saving, quality of service, data flow requirements, and the like. Device connection routing may be dynamically managed to respond to changing states of the peripheral devices and the controllers. The device connection routing may be performed for controllers associated with any type of wired or wireless buses, such as Universal Serial Bus (USB), IEEE 1394, Secure Digital Input/Output (SDIO), and the like.

17 Claims, 7 Drawing Sheets

U.S. PATENT DOCUMENTS

| | | | |
|---|---|---|---|
| 2005/0198369 A1* | 9/2005 | Armstrong et al. | 709/238 |
| 2005/0216650 A1* | 9/2005 | Tjia et al. | 710/316 |
| 2005/0286551 A1* | 12/2005 | Berman | 370/465 |
| 2006/0174032 A1* | 8/2006 | Winchester et al. | 709/238 |
| 2007/0118674 A1* | 5/2007 | Ulenas | 710/305 |

FOREIGN PATENT DOCUMENTS

JP       11112542 A  *  4/1999

OTHER PUBLICATIONS

IBM Technical Disclosure NN9411407, 1994.*
IBM Technical Disclosure NN960165, 1996.*
IBM Technical Disclosure NNRD453174, 2002.*
"Universal Serial Bus Specification" Revision 2.0, Compaq et al., Apr. 27, 2000.*
'Universal Serial Bus Specification' Revision 2.0, Apr. 27, 2000.*

* cited by examiner

DEVICE CONNECTION ROUTING FOR CONTROLLER

BACKGROUND

A controller is a hardware component of a computing device and enables the computing device to communicate with peripheral devices, which can be externally or internally coupled to the computing device. Multiple controllers may be included in the host computing device for various types of buses, such as USB, IEEE 1394, SDIO, and the like. Typically, each controller is statically connected to certain ports provided by the computing device. Peripheral devices may connect to the host computing device through these ports. In this configuration, the port to which a peripheral device is connected determines the controller with which the peripheral device is associated.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides device connection routing for controllers. A computing device is configured with multiple controllers that provide connections for peripheral devices. The controllers enable the peripheral devices to interact with the computing device through a bus. Each device connection is routed to one of the multiple controllers based on one or more pre-determined factors. These factors may include load-balancing, power saving, quality of service, data flow requirements, and the like. Device connection routing may be dynamically managed to respond to changing states of the peripheral devices and the controllers. The device connection routing may be performed for controllers associated with any type of wired or wireless buses, such as Universal Serial Bus (USB), IEEE 1394, Secure Digital Input/Output (SDIO), and the like.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for routing device connections for controllers, the system described is provided as an example and not a limitation. As those skilled in the art will appreciate, the present examples are suitable for application in a variety of different types of systems for routing communication links within a computing device.

Figure 1:
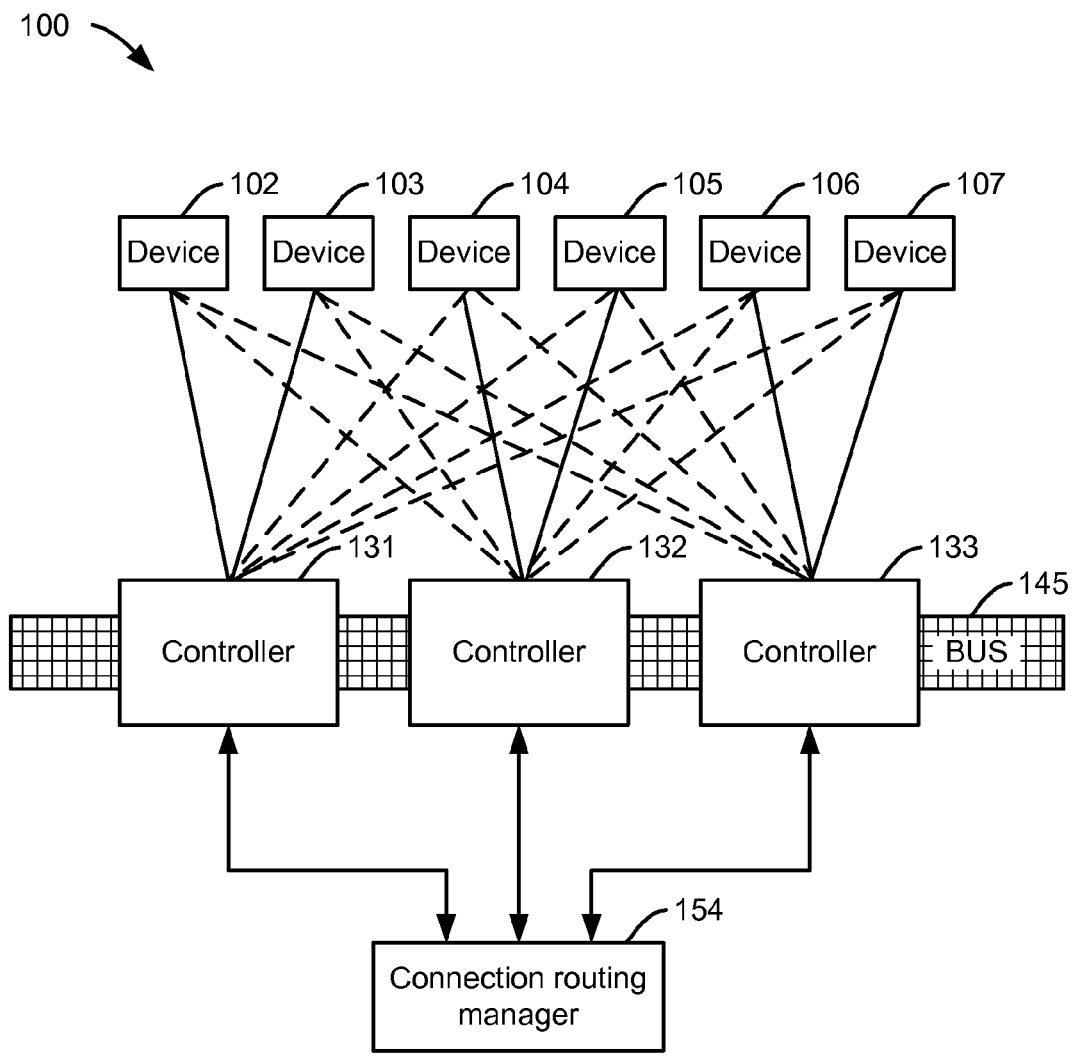
FIG. 1 shows an example system for routing device connections for controllers.

FIG. 1 shows an example system 100 for routing device connections for controllers. System 100 includes controllers 131-133, which are hardware components in a computing device. Controllers 131-133 are configured to establish connections for peripheral devices, such as devices 102-107, to interact with the computing device via bus 145. Bus 145 can be any type of data communication buses, such as Universal Serial Bus (USB), IEEE 1394, Secure Digital Input/Output (SDIO), or a wireless communication bus such as Certified Wireless USB, and the like. Devices 102-107 may be any type of devices, such as scanner, printer, control devices, storage devices, web cameras, multimedia devices, and the like.

In this example, system 100 is configured such that each of the controllers 131-133 is capable of being coupled to any of the devices 102-107. This example configuration enables controllers 131-133 to selectively provide connections to any of the devices 102-107 that are coupled to the computing device. For wired devices, the coupling can be performed by any physical electrically coupling mechanisms. For wireless devices, any type of wireless coupling mechanisms may be used. For example, a protocol may be used to cause a wireless device to establish a connection with a certain radio. Alternatively, a radio may be configured to operate on multiple simultaneous channels. Connection routing manager 154 is configured to monitor controllers 131-133 and devices 102-107. Connection routing manger 154 may gather various kinds of data to determine the states of the controllers 131-133 and devices 102-107. The states of the gathered data may include bandwidth requirement, availability and utilization, power usage, device type, operational states, and the like.

Connection routing manager 154 may use the gathered data to determine a device connection routing arrangement that distributes the device connections among controllers 131-133 based on one or more pre-determined factors. These factors may include bandwidth load-balancing of controllers 131-133, power saving, quality of service (QOS), data flow requirements, and the like. Also, connection routing may be performed to increase robustness, such as compensating for a failed controller, to load-balance for a new controller, or to reduce interference between devices. Connection routing manager 154 is typically controlled by a software component in the computing device. The software component may enable the user to select the factors to apply to the device connection routing.

Based on the determined routing arrangement, connection routing manager 154 sends control signals to controllers 131-133 to cause each controller to provide connections to one or more of the devices 102-107. Thus, the connections for devices 102-107 are distributed and routed among controllers 131-133 based on the pre-determined factors.

Connection routing manager 154 may be configured to dynamically determine the device connection routing arrangement, such as in response to changes in the states of devices 102-107 and controllers 131-133 or in a periodic basis. In this manner, connection routing manager 154 may optimize the device connections by taking changes in system 100 into consideration. Connection routing manager 154 may also be configured to enable a user to provide preferences for routing, such as providing the pre-determined factors, a priority associated with the factors, and the like.

Controllers 131-133 may be coupled to devices 102-107 with any wired or wireless mechanism. For example, controllers 131-133 and devices 102-107 may be coupled via wired connections, such as USB, IEEE 1394, SIDO and the like. Wired connections may be provided by the computing device with connection ports. Devices 102-107 may be coupled to controllers 131-133 by being plugged into these ports. Devices 102-107 may also be coupled via wireless connections. For example, a wireless adapter may provide connections between devices 102-107 and controllers 131-133.

Typically, controllers 131-133 are configured to maintain and control device connection states. For example, controllers 131-133 may be configured to detect devices 102-107 when they are coupled to the computing device. Controllers 131-133 may also be configured to maintain hardware schedule, such as data flow control and maintenance, and QOS. Controllers 131-133 may further be configured to maintain power states of devices 102-107. For example, controllers 131-133 may signal the device to suspend or resume activities, along with control instructions from software or hardware components in the computing device.

Example system 100 is shown in FIG. 1 for illustrative purpose. Actual implementation may include more, less, or different components. For example, connection routing manager 154 is shown in FIG. 1 as a separate component. In another implementation, connection routing manger 154 may be incorporated into other components, such as controllers 131-133. Other components may also be included in system 100 to couple devices 102-107 to controllers 131-133 in a wired or wireless manner.

Figure 2:
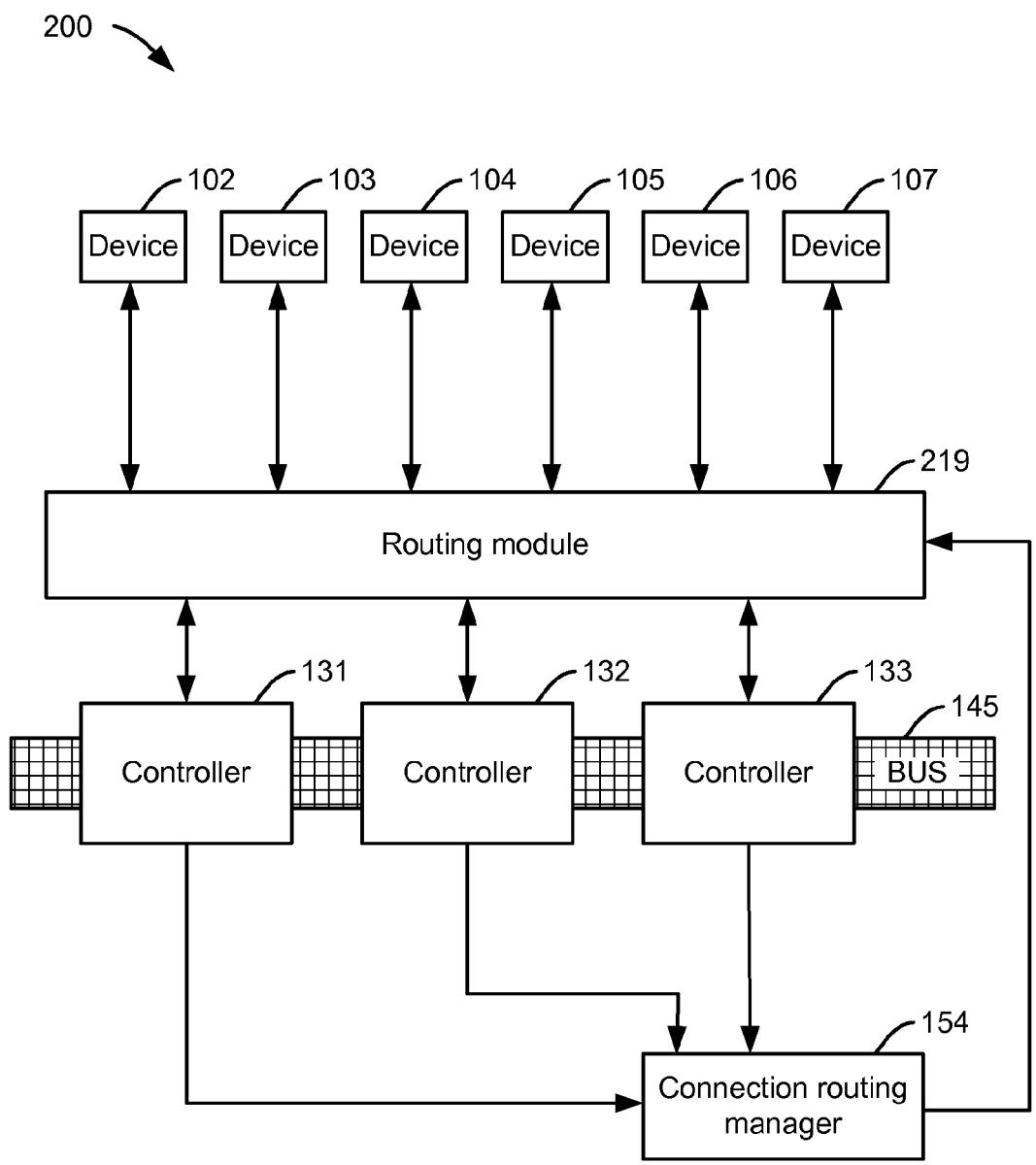
FIG. 2 shows another example system for device connection routing.

FIG. 2 shows another example system 200 for device connection routing. As shown in FIG. 2, system 200 includes routing module 219, which is a hardware component configured to route connections between devices 102-107 and controller 131-133. As shown in FIG. 2, routing module 219 is coupled to devices 102-107 as well as controller 131-133 with any kind of wired or wireless mechanisms. Routing module 219 is configured with mechanisms to connect any of the devices 102-107 to any of the controllers 131-133. Specifically, routing module 219 is also configured to connect each device to a particular controller in response to control signals received from connection routing manager 154.

In example system 200, connection routing manager 154 is configured to monitor controllers 131-133 and devices 102-107 and to determine a device connection routing arrangement based on pre-determined factors. Connection manager 154 is also configured to send control signals to routing module 219 to implement the routing arrangement. Thus, routing module 219 in example system 200 shown in FIG. 2 acts as an intermediate connection layer between devices 102-107 and controllers 131-133.

Figure 3:
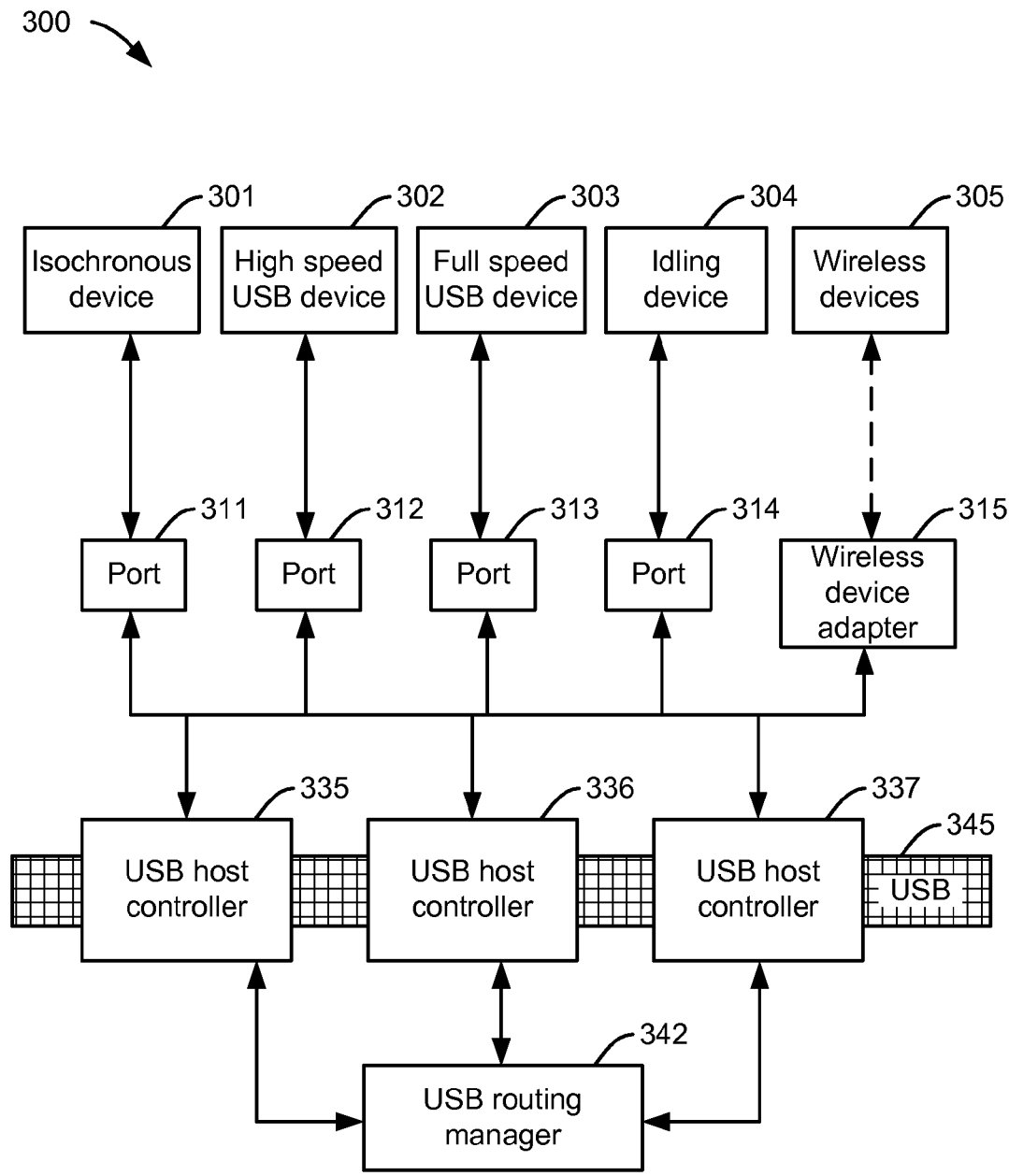
FIG. 3 shows an example system for routing device connections to USB controllers.

FIG. 3 shows an example system 300 for routing device connections to USB controllers 335-337. As shown in FIG. 3, example system 300 includes USB ports 311-314 for devices 301-304 to connect to a host computing device. Each of the USB ports 311-314 are coupled to all of the controllers 335-337, which are operating on USB 345. USB controllers 335-337 are also coupled to wireless device adapter 315, which may provide any wireless communication mechanism, such as Certified Wireless USB, Bluetooth, and the like. For example, wireless device adapter 315 may be a Host Wire Adapter (HWA) for Certified Wireless USB devices. Wireless devices 305 may be connected to controllers 335-337 through wireless device adapter 315. USB controllers 335-337 may be configured to handle communication at various speeds. For example, USB controllers 335-336 may only be capable of handling low or full speed USB traffic (in accordance with the UHCI or OHCI controller specifications), while USB controller 337 may be capable of handling only high speed USB traffic (in accordance with the EHCI controller specification).

For example system 300, USB controllers 335-337 are configured to selectively provide connections for ports 311-314 and wireless device adapter 315 in response to control signals provided by USB routing manager 342. USB routing manager may determine a device connection routing arrangement based on factors, such as power saving, bandwidth optimization, quality of service, device requirements, and the like.

Various types of devices 301-305 may be connected by example system 300. These devices may include isochronous device 301, full speed device 302, low speed device 303, idling device 304, and wireless devices 305. Isochronous device 301 is a device that communicates time-dependent data. The time-dependent data typically includes media streams that require an isochronous transport mechanism to ensure that data is delivered in a time-dependent manner. For example, a video stream may be required to be delivered so that the stream may be available as fast as it is displayed and that the audio is synchronized with the video. Isochronous device 301 may include any type of device that processes time-dependent data, such as multimedia streaming device, video camera or recorder, audio playback device, headphone, microphone, and the like. High speed device 302 may be a device that connects with a high speed USB connection while full speed device 303 may be connecting with a full or low speed USB connection. Idling device 304 may be a device that is in a suspended state. Idling device 304 may only have limited bandwidth usage requirement but may have power requirement, such as for charging.

In operation, USB routing manager 342 monitors the states of USB controllers 335-337 and devices 301-305. Based on the information gathered from the monitoring, USB routing manager 342 determines which device should be routed to which USB controller. For example, USB routing manager 342 may load-balance the USB controllers 335-337 to ensure that the bandwidth requirements of devices 301-305 are met or are optimized. If additional bandwidth is required, USB routing manager 342 may route an isochronous device to a USB controller with no other load or with very light load. If there are more devices than USB controllers, USB routing manager 342 may at least try to keep isochronous devices to their own controller. If there are still too many devices, USB routing manager 342 may bundle an isochronous device with another device that consumes the least amount of bandwidth. A similar process may be used for bulk devices, such as storage devices.

USB routing manager 342 may also determine whether a HWA is connected. If so, USB routing manager 342 may assign the HWA to a USB controller and prevent other devices from connect to that same controller. If other USB controllers have maximized their bandwidth utilization and the USB controller for the HWA has available bandwidth, USB routing manager 342 may allow other devices to connect to that USB controller.

Figure 4:
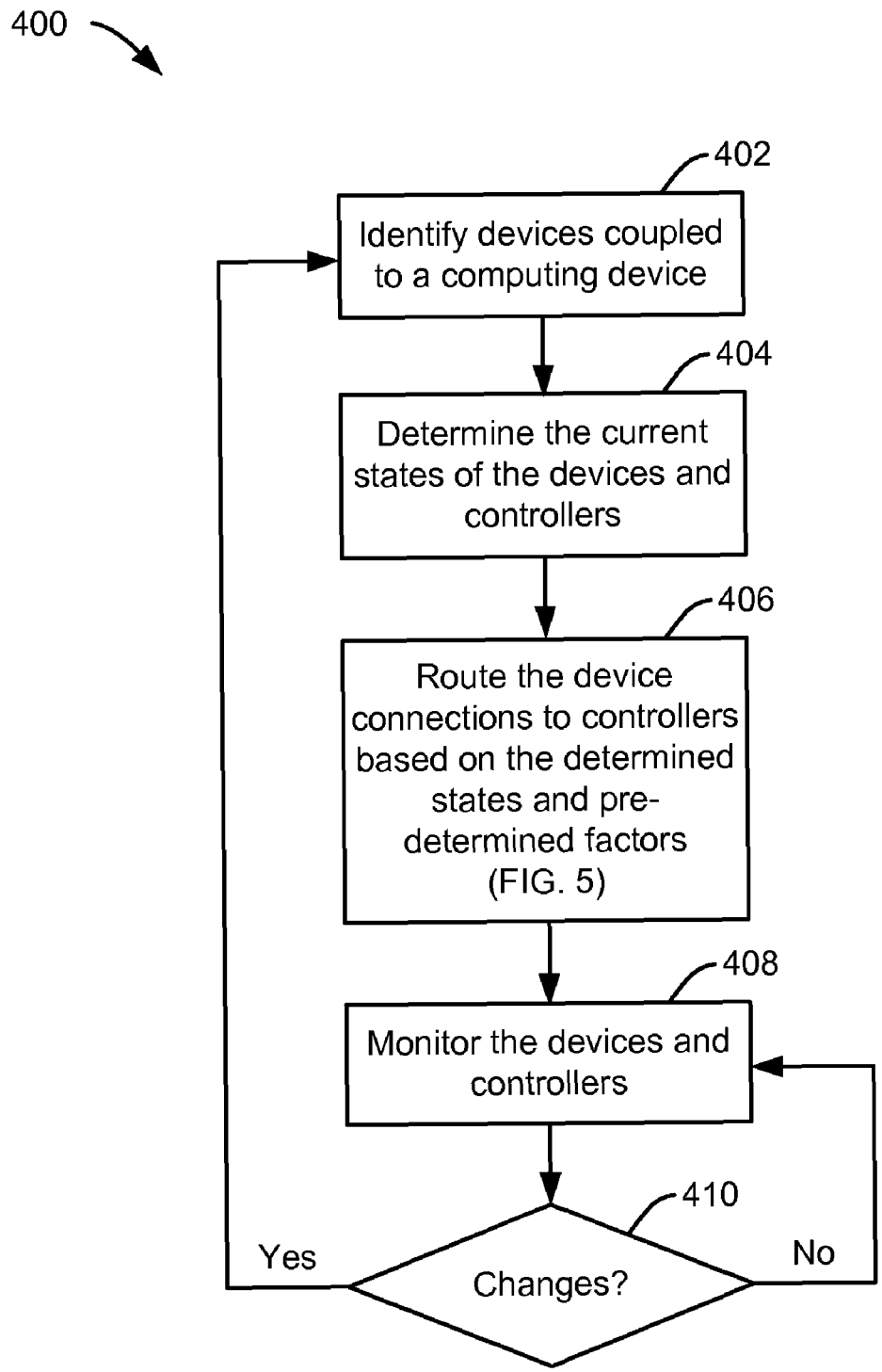
FIG. 4 shows an example process for routing peripheral devices to controllers.

FIG. 4 shows an example process 400 for routing peripheral devices to controllers. Process 400 may be implemented on a computing device to dynamically route each peripheral device to one of the multiple controllers of the computing device based on one or more factors. For example, a device connection routing manager may implement process 400 to load-balance the controllers, to save power, and the like. At block 402, devices that are coupled to the computing device are identified. These devices may be coupled with any wired or wireless mechanisms, such as wired USB, Certified Wireless USB, IEEE 1394, SDIO, removable memory slots, and the like. At block 404, the current states of the devices and the controllers are determined. The states of the devices may include device type, data transmission bandwidth requirements, isochronous data transmission requirements, operational states, power usage, and the like. The states of the controllers may include bandwidth availability and utilization, power usage, and the like.

At block 406, the device connections are routed to the controllers based on the determined states and one or more pre-determined factors. The routing may be performed by the controllers or by a routing module. An example routing scheme will be discussed in conjunction with FIG. 5 and 6.

At block 408, the states of the peripheral devices and the controllers are monitored. Monitoring the states enable the device connections to be dynamically routed in response to changes. At decision block 410, a determination is made whether there are changes to the states of the peripheral devices and the controllers. If so, process 400 returns to block 402, which restarts the process of identifying the coupled devices and determines the state of those devices. If there is no change, process 400 continues to monitor the peripheral devices and the controllers at block 408.

Figure 5:
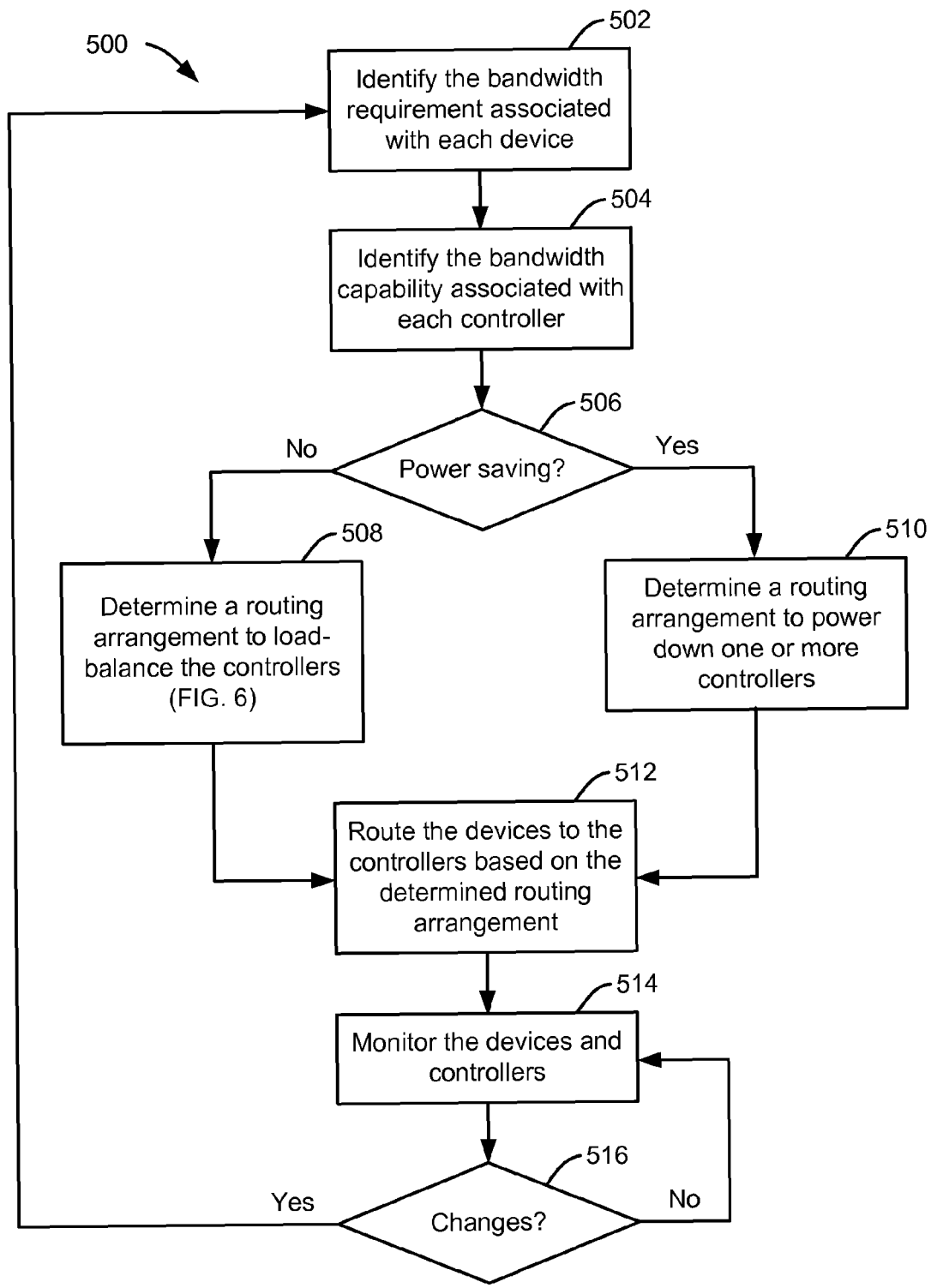
FIG. 5 shows an example process for determining a device connection routing arrangement.

FIG. 5 shows an example process 500 for determining a device connection routing arrangement. At block 502, the bandwidth requirement associated with each peripheral device that is coupled to a computing device is determined. At block 504, the bandwidth capability associated with each controller in the computing device is determined. At decision block 506, a determination is made whether power saving is a factor for consideration in the connection routing arrangement. Power saving may be selected as a factor by a user. Power saving may also be a default setting on some systems, such as portable computing devices. If power saving is a factor, process 500 moves to block 510 where a routing arrangement that enables one or more controllers to be powered down is determined. For example, if the bandwidth requirements of the peripheral devices can be provided by one or two controllers, the routing arrangement may route all of the device connections to these controllers and power down the rest of the controllers to save power.

Returning to decision block 506, if power saving is not a factor, process 500 moves to block 508 where a routing arrangement to load-balance the controllers are determined. Load-balancing can be performed based on one or more pre-determined factors. In another implementation, the load-balancing may also be performed on controllers that are not powered down in block 510. An example load-balancing scheme will be discussed in conjunction with FIG. 6. At block 512, the devices are routed to the controllers based on the determined routing arrangement.

At block 514, the states of the peripheral devices and the controllers are monitored. Monitoring the states enable the device connections to be dynamically routed in response to changes in bandwidth requirements. At decision block 516, a determination is made whether there are changes to the states of the peripheral devices and the controllers. If so, process 500 returns to block 502, which restarts the process of identifying the bandwidth requirement of each coupled device. If there is no change, process 500 continues to monitor the peripheral devices and the controllers at block 514.

Figure 6:
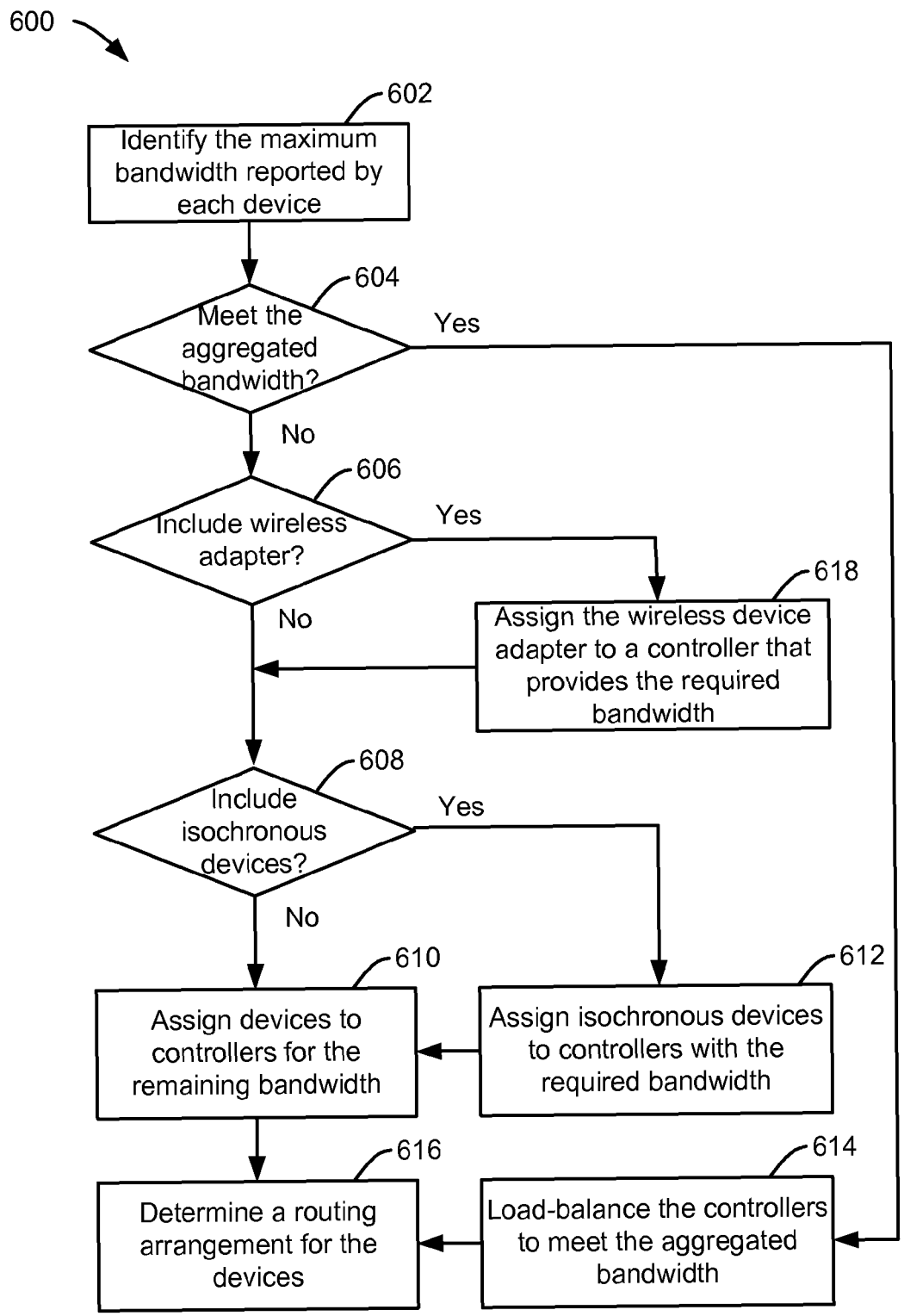
FIG. 6 shows an example process to load-balance controllers in a computing device.

FIG. 6 shows an example process 600 to load-balance controllers in a computing device. Process 600 may be implemented by a connection routing manager to determine a routing arrangement. At block 602, the maximum data transmission bandwidth reported by each peripheral device connected to a host computing device is determined. The maximum bandwidth may be the actual utilized bandwidth, the reserved bandwidth, or the maximum bandwidth that the device is capable of utilizing. At decision block 604, a determination is made whether the bandwidth aggregated among all of the coupled peripheral devices can be met by the controllers. For example, the aggregated bandwidth may include the actual bandwidth usage or the bandwidth that the devices are capable of using. If so, process 600 goes to block 614 where the controllers are load-balanced to meet the aggregated bandwidth. The load-balancing may include assigning wireless adapter and isochronous device on their own controllers as described in block 612 and 618. Process 600 then moves to block 616.

Returning to decision block 604, if the aggregated bandwidth is not met, process 600 continues at block 606 where a decision is made whether a wireless device adapter, such as a HWA, is included. A wireless device adapter may require significant bandwidth because the adapter can support multiple high speed wireless devices. If a wireless adapter is not included in the coupled peripheral devices, process 600 moves to decision block 608. If a wireless adapter is included, the process goes to block 618 where the wireless device adapter is assigned to a controller that provides the required bandwidth. It is advantageous to assign a wireless device adapter to its own separate controller since the actual bandwidth usage by the adapter may increase significantly when more wireless devices are being handled by the adapter. The process then moves to decision block 608.

At decision block 608, a determination is made whether isochronous devices are included. Isochronous devices typically require bandwidth that is readily available and does not vary over time. Thus, the isochronous devices are assigned to controllers that have the required bandwidth. At block 610, the remaining devices are assigned to the controllers for the remaining bandwidth. Typically, remaining devices are first assigned to controllers that do not handle the connections for the wireless device adapter and the isochronous devices. At block 616, a routing arrangement for the devices is determined.

Figure 7:
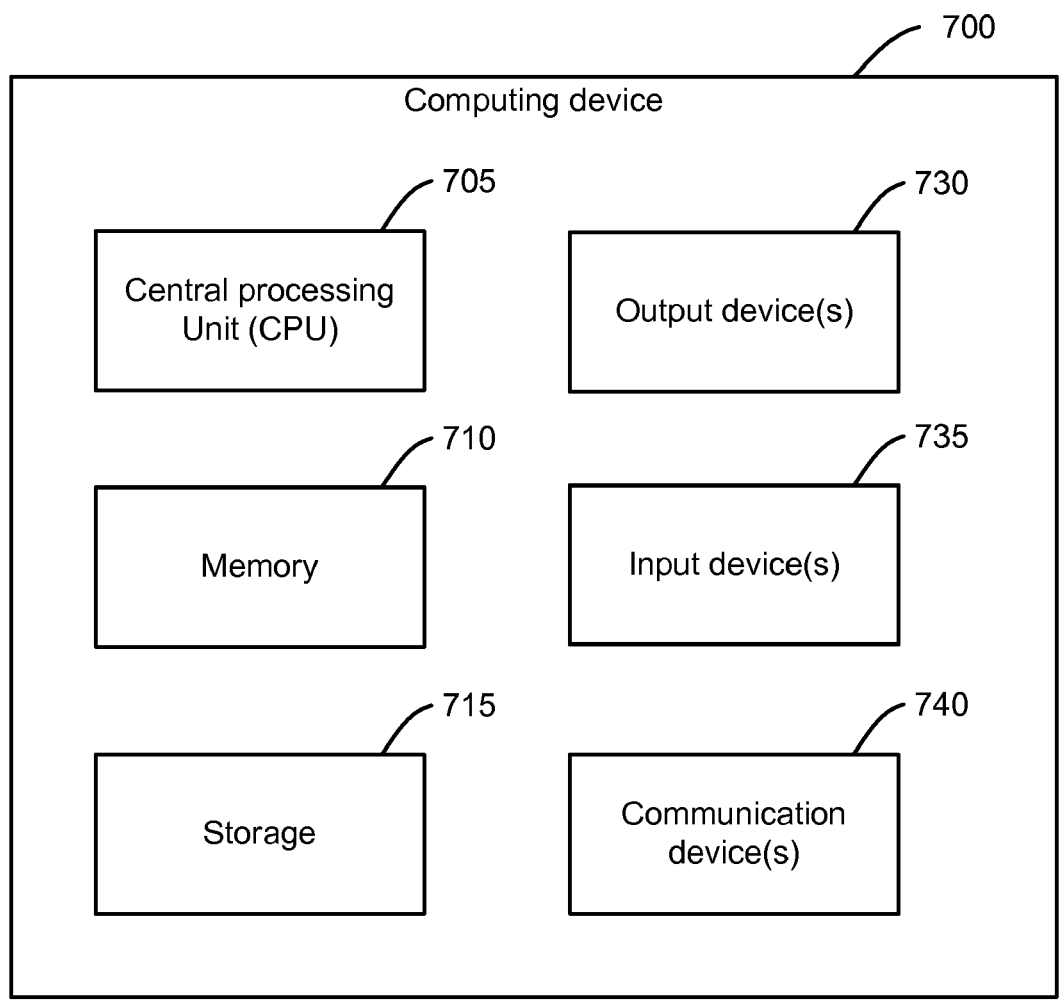
FIG. 7 shows an exemplary computer device for implementing the described systems and methods.

FIG. 7 shows an exemplary computer device 700 for implementing the described systems and methods. In its most basic configuration, computing device 700 typically includes at least one central processing unit (CPU) 705 and memory 710.

Depending on the exact configuration and type of computing device, memory 710 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 715. Computer storage media includes volatile and nonvolatile, removable and non-removable media implemented in any method or technology for storage of information such as computer readable instructions, data structures, program modules or other data. Memory 710 and storage 715 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 740 that allow the device to communicate with other devices. Communications device(s) 740 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 735 such as keyboard, mouse, pen, voice input device, touch input device, etc. Output device(s) 730 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. An apparatus comprising a connection routing manager configured to interact with multiple host controllers in a computing device, each controller configured to provide device connections between multiple peripheral devices and the computing device via a bus, the connection routing manager also configured to identify power requirements, bandwidth requirements associated with the peripheral devices and the controllers and available bandwidth, the connection routing manager further configured to determine a routing arrangement that distributes the peripheral device connections among the controllers based, at least in part, on the identified power requirements, identified bandwidth requirements and power savings considerations, the connection routing manager further configured to determine a routing arrangement that enables a controller to be powered down and meet the identified bandwidth requirements with the available bandwidth, the connection routing manager further configured to power down at least one controller if the identified bandwidth requirements can be met without the powered down controller, wherein the connection routing manager is controlled by a software component configured to enable a user to select factors for determining the routing arrangement.

2. The apparatus as recited in claim 1, wherein the connection routing manager is further configured to monitor the peripheral devices for a change in states; and to dynamically re-route the peripheral devices to the controllers based, at least in part, on the change.

3. The apparatus as recited in claim 1, wherein the controllers are configured to provide at least one of a wired device connection or a wireless device connection.

4. The apparatus as recited in claim 1, wherein the bus includes at least one of Universal Serial Bus (USB), IEEE 1394, Secure Digital Input/Output (SDIO), wireless bus, wired bus, or Certified Wireless USB.

5. The apparatus as recited in claim 1, wherein the connection routing manager is incorporated into the controllers and wherein the connection routing manager is further configured to route the device connections to the controllers based, at least in part, on the determined routing arrangement.

6. The apparatus as recited in claim 1, further comprising a routing module coupled to the peripheral devices and the controllers; wherein the connection routing manager is further configured to generate control signals based, at least in part, on the determined routing arrangement and to provide the control signals to the routing module, and wherein a routing module is further configured to route the device connections to the controllers in response to the control signals.

7. The apparatus as recited in claim 1, wherein the connection routing manager is controlled by a software component in the computing device.

8. One or more computer-readable storage media encoded with device-executable instructions for performing steps comprising: identifying peripheral devices coupled to a computing device; determining a state associated with each peripheral device; identifying controllers configured to provide connections between the peripheral devices and the computing device via a bus; determining factors for distributing the connections among the controllers; and routing each peripheral device to one of the controllers based, at least in part, on the determined state and factors, wherein the states include bandwidth requirement, bandwidth availability, bandwidth utilization, power usage, device type and operational states, and, wherein the factors include load-balancing, quality of service, data flow requirements, bandwidth optimization, device requirements and power saving;

determining a routing arrangement to power down at least one of the controllers; and routing the peripheral devices to the controllers based, at least in part, on the routing arrangement, powering down at least one controller if bandwidth requirements can be met with the available bandwidth without the powered down controller; and enabling a user to select factors for determining the routing arrangement using a software component.

9. The one or more computer-readable storage media as recited in claim 8, further comprising: monitoring the peripheral devices for a change in the states; and dynamically rerouting the peripheral devices to the controllers based, at least in part, on the change.

10. The one or more computer-readable storage media as recited in claim 8, further comprising: identifying the maximum bandwidth reported by each peripheral device; determining a routing arrangement to load-balance an aggregated bandwidth reported by the peripheral devices; and routing the peripheral devices to the controllers based, at least in part, on the routing arrangement.

11. The one or more computer-readable storage media as recited in claim 10, further comprising: identifying a wireless adapter among the peripheral devices; routing the wireless adapter to a selected controller; and preventing other peripheral devices from being routed to the selected controller if the aggregated bandwidth of the other peripheral devices can be met with the remaining controllers.

12. The one or more computer-readable storage media as recited in claim 11, further comprising if the aggregated bandwidth of the other peripheral devices cannot be met with the remaining controllers, allowing a peripheral device with the smallest bandwidth requirement to be routed to the selected controller.

13. The one or more computer-readable storage media as recited in claim 10, further comprising: identifying an isochronous device among the peripheral devices; routing the isochronous device to a selected controller; and preventing other peripheral devices from being routed to the selected controller if the aggregated bandwidth of the other peripheral devices can be met with the remaining controllers.

14. The one or more computer-readable storage media as recited in claim 13, further comprising if the aggregated bandwidth of the other peripheral devices cannot be met with the remaining controllers, allowing a peripheral device with the smallest bandwidth requirement to be routed to the selected controller.

15. A system for providing device connections to a computing device comprising: means for identifying peripheral devices coupled to the computing device and controllers configured to provide connections between the peripheral devices and the computing device via a bus; means for identifying a bandwidth requirement associated with each peripheral device; means for identifying a bandwidth capability associated with each controller; means for determining if one of the peripheral devices is an isochronous device; means for assigning the isochronous device to a controller with bandwidth required of the isochronous device, if one of the peripheral devices is an isochronous device; means for determining a routing arrangement to load-balance the controllers based, at least in part, on the identified bandwidth requirements and bandwidth capabilities; and means for routing each remaining peripheral device to one of the controllers in accordance with the determined routing arrangement, wherein the means for determining a routing arrangement is controlled by a software component configured to enable a user to select factors for determining the routing arrangement.

16. The system as recited in claim 15, further comprising: means for monitoring the peripheral devices for changes in the bandwidth requirements; and means for dynamically routing the peripheral device to the controllers based, at least in part, on the monitored changes.

17. The one or more computer-readable storage media as recited in claim 8, wherein at least one of the factors is based on a user's preferences.

* * * * *